(12) United States Patent
de Lore et al.

(10) Patent No.: US 10,145,242 B2
(45) Date of Patent: Dec. 4, 2018

(54) CONVEYOR BRIDGE

(71) Applicant: Joy MM Delaware, Inc., Wilmington, DE (US)

(72) Inventors: Andrew P. de Lore, Yattalunga (AU); Travers T. Wood, Springfield (AU)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/714,300

(22) Filed: Sep. 25, 2017

(65) Prior Publication Data

US 2018/0010455 A1 Jan. 11, 2018

Related U.S. Application Data

(63) Continuation of application No. 15/170,753, filed on Jun. 1, 2016, now Pat. No. 9,771,799.

(60) Provisional application No. 62/170,121, filed on Jun. 2, 2015.

(51) Int. Cl.
*B65G 21/14* (2006.01)
*E21C 27/00* (2006.01)
*E21F 13/06* (2006.01)
*E21C 27/02* (2006.01)
*B65G 21/12* (2006.01)

(52) U.S. Cl.
CPC ............ *E21F 13/06* (2013.01); *B65G 21/12* (2013.01); *B65G 21/14* (2013.01); *E21C 27/02* (2013.01); *B65G 2201/045* (2013.01)

(58) Field of Classification Search
CPC .............................. E21F 13/06; B65G 21/2054
USPC ....................... 198/539, 812, 841; 299/18, 43
See application file for complete search history.

(56) References Cited

U.S. PATENT DOCUMENTS

| | | | |
|---|---|---|---|
| 3,351,179 A * | 11/1967 | Thomson | B65G 21/14 198/825 |
| 3,601,263 A | 8/1971 | Stratton et al. | |
| 3,755,039 A | 8/1973 | Terry | |
| 3,810,694 A | 5/1974 | Harrell et al. | |
| 3,850,283 A | 11/1974 | Nordstrom | |
| 4,281,955 A * | 8/1981 | McWilliams | B65G 21/14 198/303 |
| 4,311,230 A | 1/1982 | Crawford et al. | |
| 4,360,098 A | 11/1982 | Nordstrom | |
| 4,574,943 A * | 3/1986 | Green | B65G 23/26 192/48.8 |
| 4,598,526 A | 7/1986 | Milligan et al. | |
| 4,648,776 A | 3/1987 | Hradil et al. | |
| 5,154,404 A | 10/1992 | Orsinger et al. | |

(Continued)

*Primary Examiner* — Douglas A Hess
(74) *Attorney, Agent, or Firm* — Michael Best & Friedrich LLP (57) ABSTRACT

A conveyor includes an endless belt, a boot end supporting a portion of the endless belt, a support structure, and a bridge. The endless belt includes a first run and a second run, and the first run extends along a conveyor axis. The support structure includes an end spaced apart from the boot end, a plurality of frames, and a plurality of idler rolls. The frames are spaced apart from one another and aligned with one another in a direction parallel to the conveyor axis. The idler rolls support another portion of the endless belt. The bridge extends between the boot end and the end of the support structure. The bridge is movable in a direction parallel to the conveyor axis relative to at least one of the boot end and the support structure.

20 Claims, 12 Drawing Sheets

(56) References Cited

U.S. PATENT DOCUMENTS

| | | | |
|---|---|---|---|
| 5,190,145 A * | 3/1993 | Ledginham | B65G 21/22 198/841 |
| 5,360,316 A | 11/1994 | O'Mara et al. | |
| 5,657,529 A | 8/1997 | Bohn et al. | |
| 6,949,060 B2 | 9/2005 | Lenk | |
| 6,959,803 B1 | 11/2005 | Layne et al. | |
| 7,395,918 B2 * | 7/2008 | Thompson | B65G 21/14 193/35 TE |
| 7,402,130 B1 | 7/2008 | Sjostedt et al. | |
| 7,690,882 B1 | 4/2010 | Sjostedt et al. | |
| 7,837,030 B2 * | 11/2010 | Daly | B65G 15/62 198/822 |
| 8,925,718 B2 * | 1/2015 | Miles | B65G 21/06 198/860.1 |
| 9,010,275 B2 * | 4/2015 | Lindvall | A01K 1/0117 119/164 |
| 9,394,133 B2 * | 7/2016 | Knoefel | B65H 29/38 |
| 9,731,901 B2 * | 8/2017 | Lurie | B65G 23/14 |
| 2002/0104468 A1 | 8/2002 | Myers et al. | |

\* cited by examiner

CONVEYOR BRIDGE

REFERENCE TO RELATED APPLICATIONS

This application is a continuation of U.S. patent application Ser. No. 15/170,753, filed Jun. 1, 2016, which claims the benefit of prior-filed, U.S. Provisional Patent Application No. 62/170,121, filed Jun. 2, 2015. The entire contents of these documents are hereby incorporated by reference.

BACKGROUND

The present disclosure relates to conveyor systems, and particularly to a bridge for a mining conveyor system.

Longwall mining systems typically include a beam stage loader receiving material cut from a mine face by a longwall shearer. The beam stage loader then transfers the cut material onto a boot end where the material is carried away by a main gate conveyor. The length of the main gate conveyor changes as the mining operation progresses through a mine seam. For example, as the conveyor is shortened in a retreating mining operation, the conveyor support structure is removed to accommodate the advance of the mining equipment.

SUMMARY

In one aspect, a conveyor includes an endless belt, a boot end supporting a portion of the endless belt, a support structure, and a bridge. The endless belt includes a first run and a second run, and the first run extends along a conveyor axis. The support structure includes an end spaced apart from the boot end, a plurality of frames, and a plurality of idler rolls. The frames are spaced apart from one another and aligned with one another in a direction parallel to the conveyor axis. The idler rolls support another portion of the endless belt. The bridge extends between the boot end and the end of the support structure. The bridge is movable in a direction parallel to the conveyor axis relative to at least one of the boot end and the support structure.

In another aspect, a bridge is provided for a conveyor system. The conveyor system includes an endless belt, a boot end supporting a portion of the endless belt, and a support structure including an end spaced apart from the boot end and supporting another portion of the endless belt. The endless belt has a first run defining a conveyor axis and a second run. The bridge includes a first end for coupling to the boot end, a second end opposite the first end, a pair of elongated members extending between the first end and the second end, and at least one roll. A bridge axis extends between the first end and the second end and is oriented substantially parallel to the conveyor axis. The second end is configured to be supported for movement along the bridge axis relative to the support structure. The at least one roll is positioned between the elongated members transverse to the bridge axis, and the roll is configured to support one of the first run of the belt and the second run of the belt.

In yet another aspect, a longwall mining system includes a mining machine for cutting material from a mine face, a face conveyor receiving the cut material and transporting the cut material, a stage loader receiving the cut material from the face conveyor, and a gate conveyor receiving the cut material from the stage loader. The gate conveyor includes an endless belt, a boot end supporting a portion of the endless belt, a support structure, and a bridge. The endless belt includes a first run and a second run, and the first run extends along a conveyor axis. The support structure includes an end spaced apart from the boot end, a plurality of frames, and a plurality of idler rolls. The frames are spaced apart from one another and aligned with one another in a direction parallel to the conveyor axis. The idler rolls support another portion of the endless belt. The bridge extends between the boot end and the end of the support structure. The bridge is movable in a direction parallel to the conveyor axis relative to at least one of the boot end and the support structure.

Other aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

DETAILED DESCRIPTION

Figure 1:
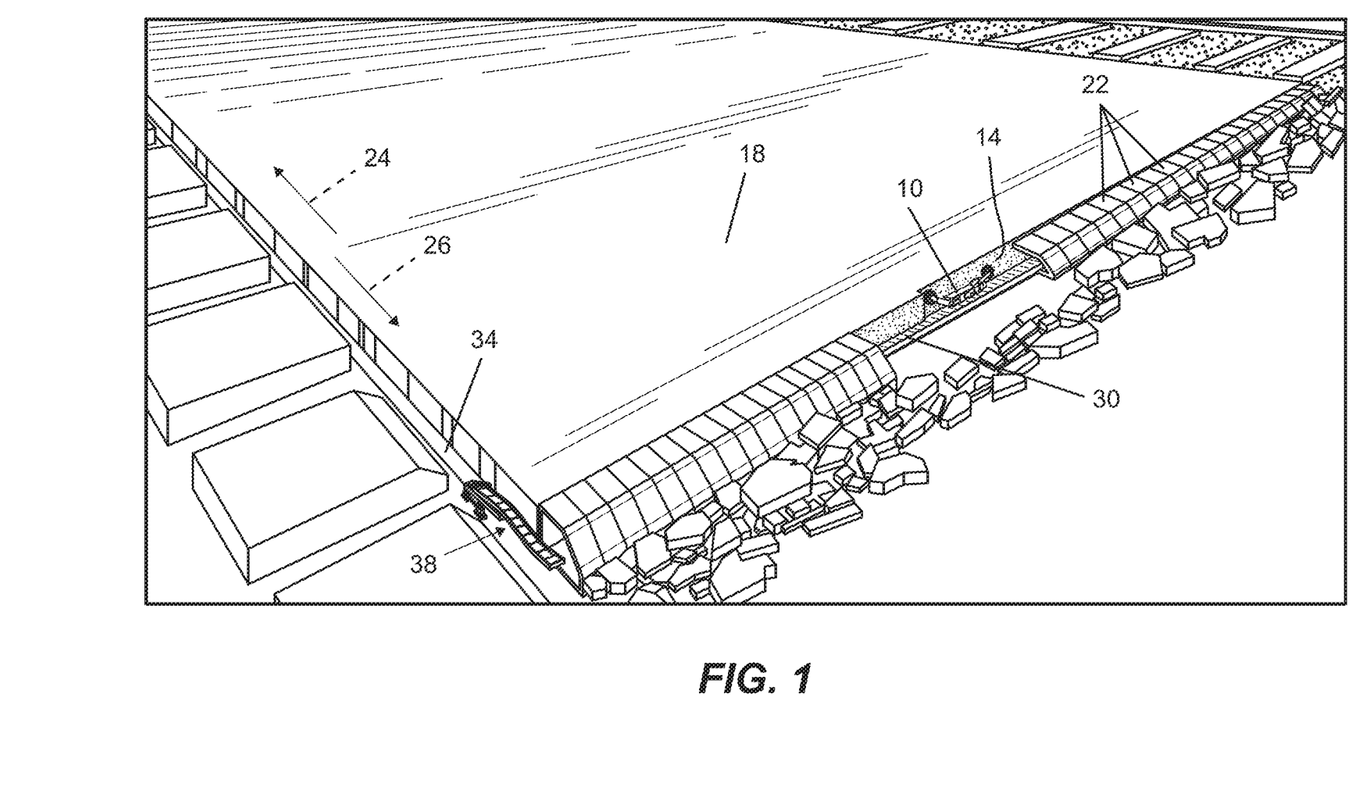
FIG. 1 is a perspective view of a mining operation.
Figure 2:
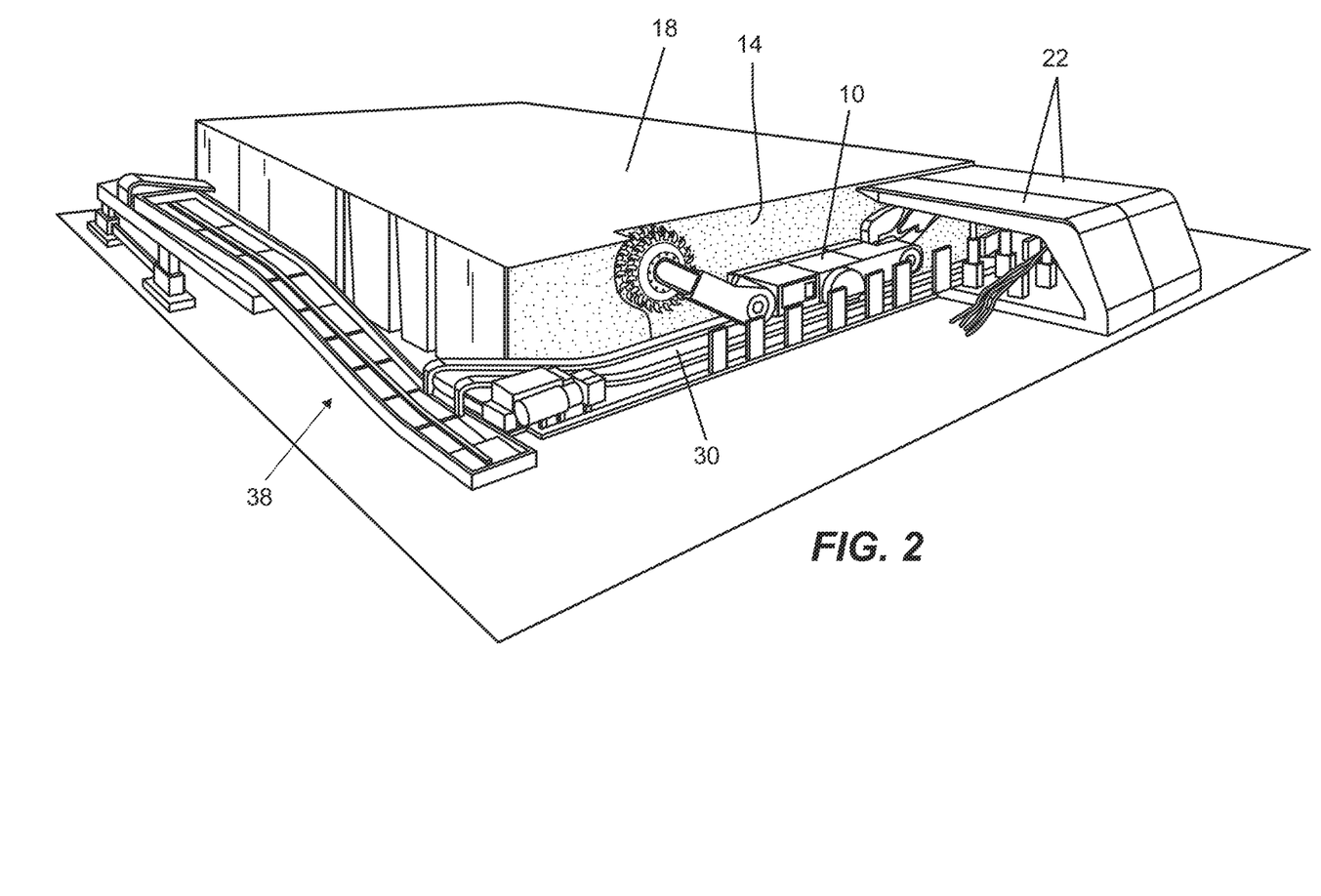
FIG. 2 is an enlarged perspective view of the mining operation of FIG. 1.

FIGS. 1 and 2 illustrate a longwall mining operation. A mining machine 10 excavates material from a mine face 14 of a mineral seam 18, and progresses through the seam 18 as material is removed. In the illustrated embodiment, the mining machine 10 is a conventional longwall shearer, and the structure and operation of the shearer may be readily understood by a person of ordinary skill in the art. In other embodiments, a different type of mining machine may be used. Roof supports 22 are aligned in a row along the length of the mine face 14 to provide protection (a portion of the roof supports 22 are removed in FIGS. 1 and 2 to illustrate the mining machine 10 and mine face 14). As the shearer 10 removes material from the mine face 14, the cut material is directed onto a face conveyor 30 that conveys the material generally parallel to the mine face 14 and toward a maingate conveyor 34 (FIG. 1). In the illustrated embodiment, the face conveyor 30 deposits the cut material on a beam stage loader 38 positioned adjacent an end of the mine face 14. In some embodiments, the cut material may pass through a sizer or crusher (not shown) before or after it is deposited on the beam stage loader 38.

Referring to FIG. 1, in the illustrated embodiment, the mining operation is "retreating" such that the shearer 10 progresses through the seam 18 in a direction 24 oriented toward a mine exit. In other embodiments, the operation may be "advancing" such that the shearer 10 progresses through the seam 18 in a direction 26 oriented away from the mine exit.

Figure 3:
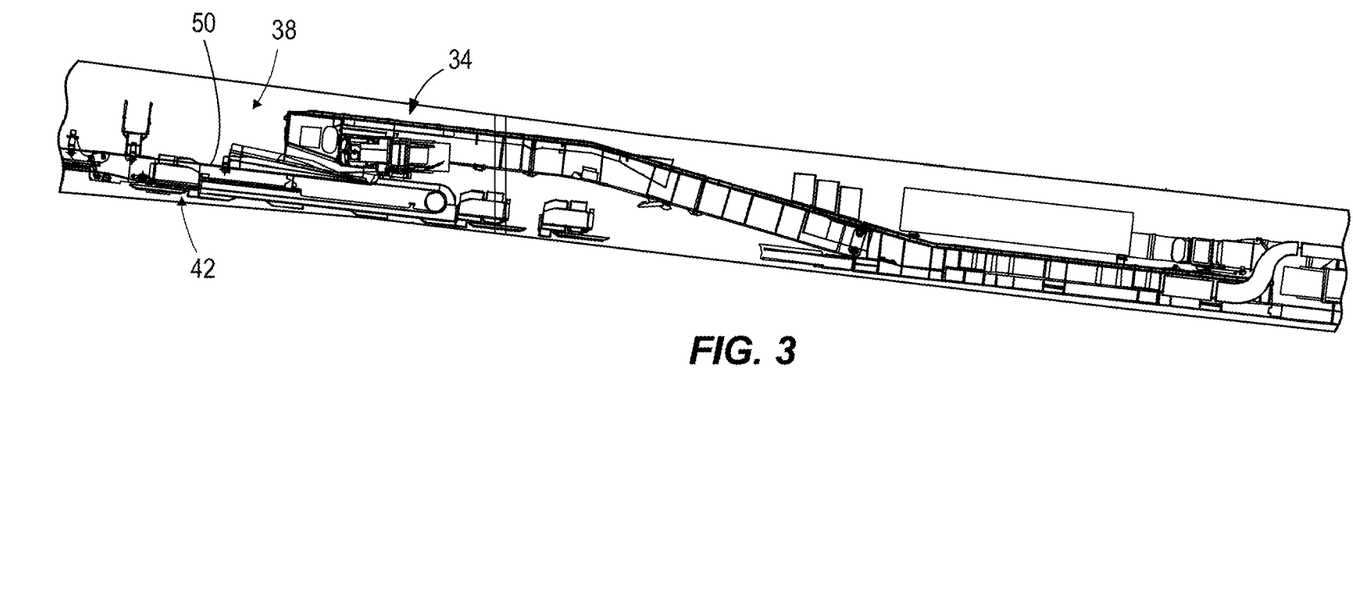
FIG. 3 is a side view of a beam stage loader, a boot end, and a portion of a gate conveyor.
Figure 4:
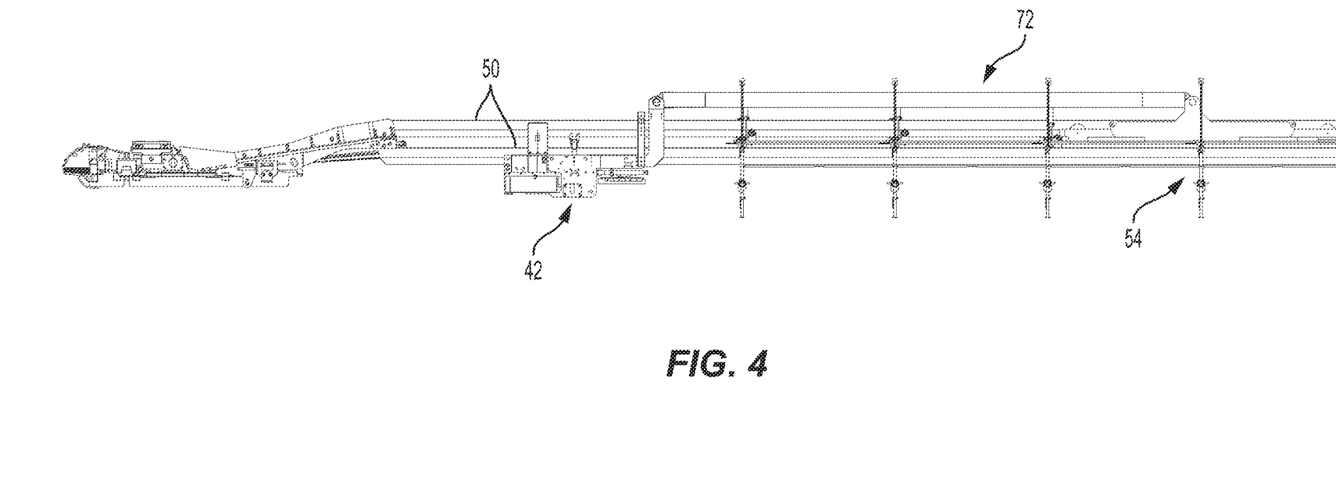
FIG. 4 is a side view of a boot end and a portion of the conveyor system of FIG. 3.

As shown in FIGS. 3 and 4, the beam stage loader 38 transfers material to a longwall boot end 42 (FIG. 3), which forms the entry end of the gate conveyor 34. In the illustrated embodiment, the boot end 42 is separate from the beam stage loader 38 and is movable relative to the beam stage loader 38. In other embodiments, the boot end 42 may include fewer or more movable portions.

Referring now to FIG. 4, the gate conveyor 34 includes a conveyor belt 50 and a support structure 54. The boot end 42 includes a tail pulley (not shown) supporting one end of the conveyor belt 50. The support structure 54 supports the conveyor belt 50 outbye of the boot end 42. Also, as used herein, the term "outbye" refers to a direction oriented away from the mine face 14 (FIG. 1), and the term "inbye" refers to a direction oriented toward the mine face 14.

Figure 5:
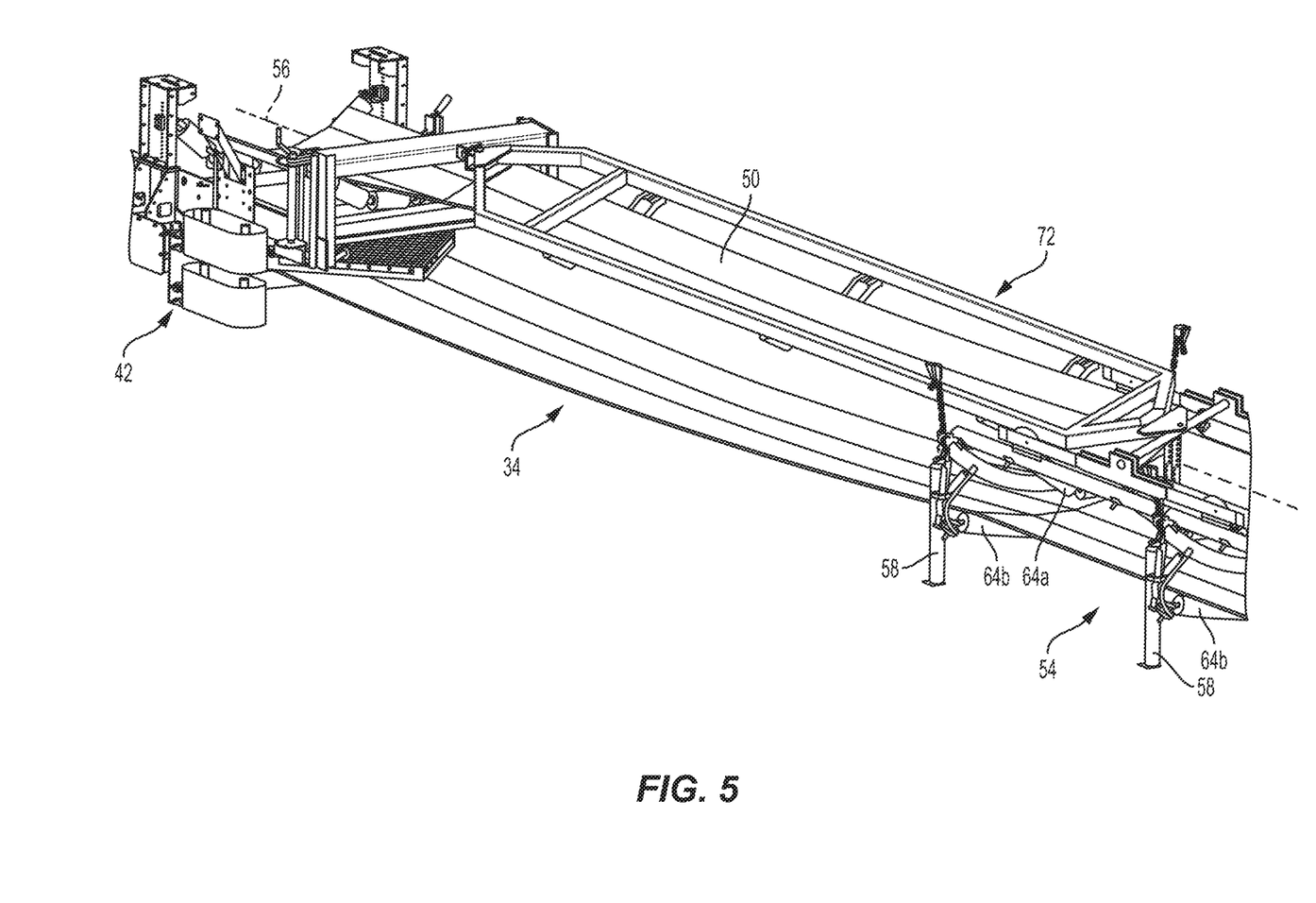
FIG. 5 is a perspective view of a portion of the conveyor system of FIG. 4.

As shown in FIGS. 4 and 5, the belt 50 extends in a continuous, endless loop between the boot end 42 and a discharge terminal (not shown) of the gate conveyor 34. The belt 50 includes a first or upper run (also referred to as a carry run) and a second or lower run (also referred to as a return run). The upper run carries the cut material and extends along a conveyor axis 56 (FIG. 5).

Figure 6:
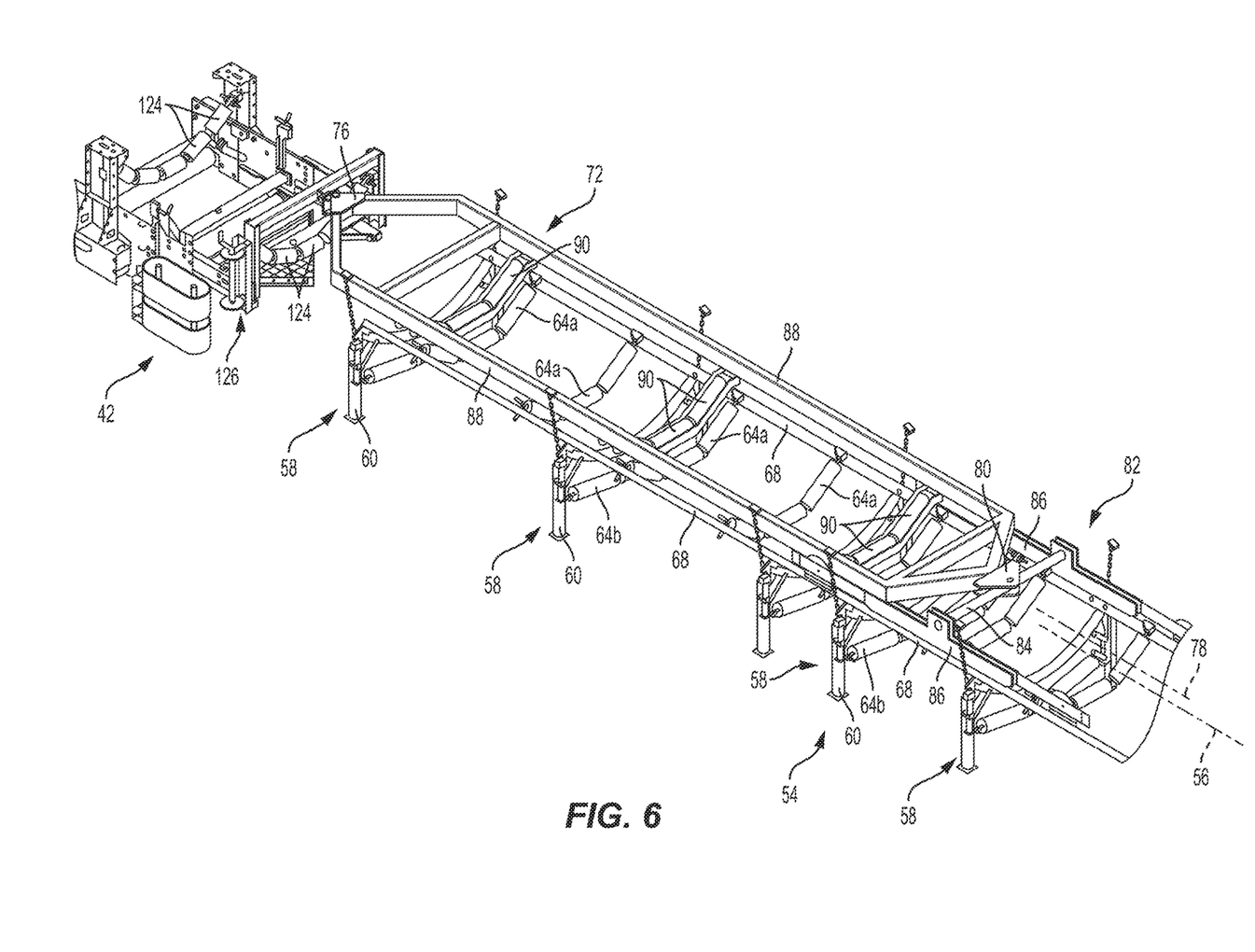
FIG. 6 is a perspective view of a boot end, a bridge, and a support structure of a conveyor system, with a conveyor belt removed.
Figure 7:
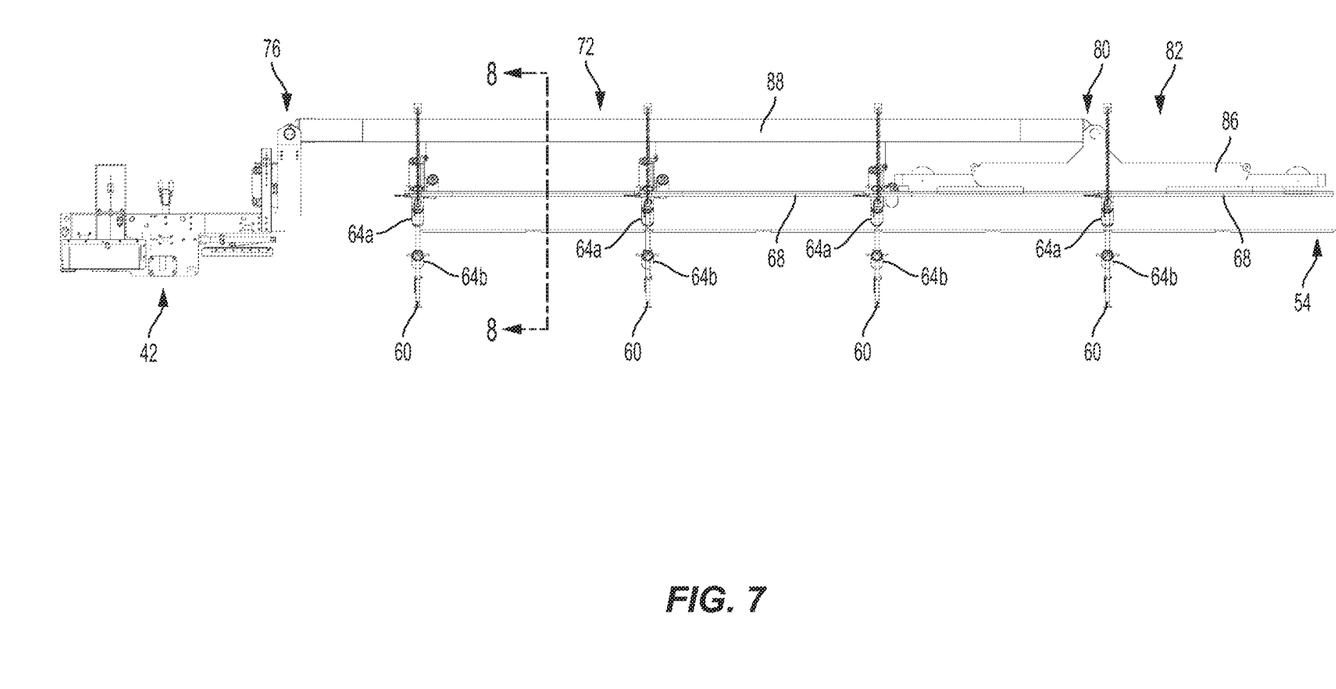
FIG. 7 is a side view of the bridge and the support structure of FIG. 6.
Figure 8:
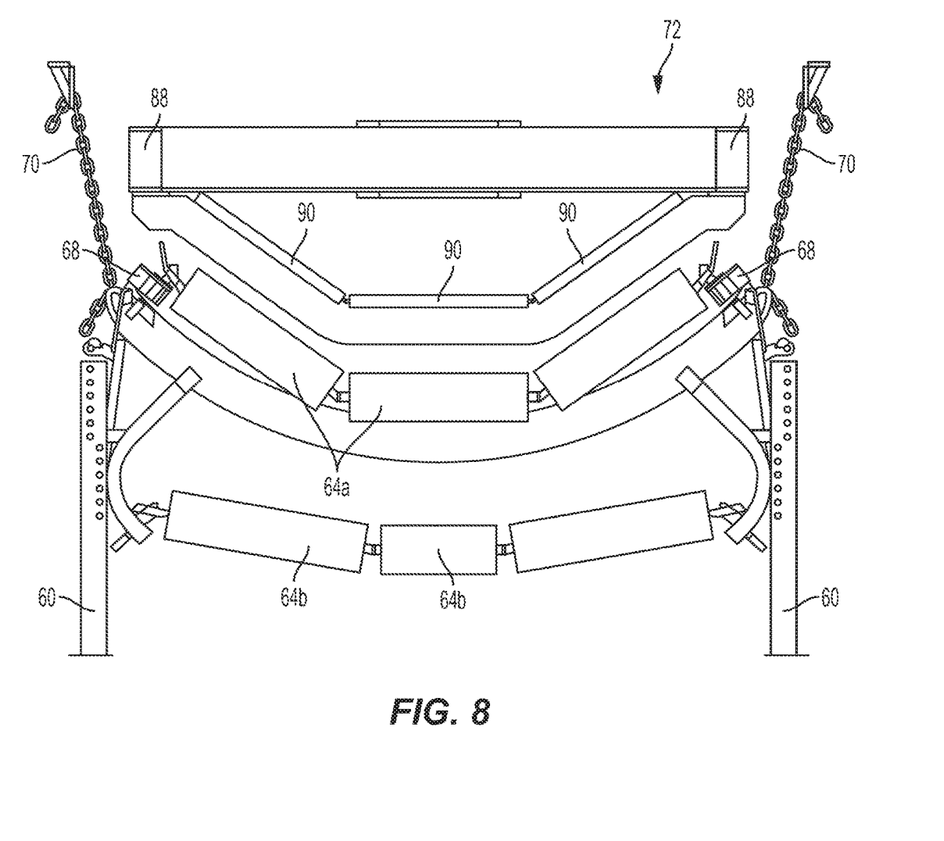
FIG. 8 is a section view of the bridge and the support structure of FIG. 7, viewed along section 8-8.

As shown in FIGS. 6-8, the support structure 54 includes multiple sections. Each section includes a frame 58 including a pair of legs or stands 60, and idler rolls 64 extending laterally between the stands 60 to support the upper and lower runs of the conveyor belt 50. In the illustrated embodiment, the frame 58 has a generally H-shape. The idler rolls 64 include a set of first or carry rolls 64a and a set of second or return rolls 64b. The carry rolls 64a support a first or upper run of the belt 50 conveying the material, and the return rolls 64b support a second or lower run of the belt 50. The support structure 54 also includes a pair of stringers 68 extending between the stands 60 of adjacent frames 58.

In the illustrated embodiment, the stringers 68 include mounting features (e.g., holes, brackets, etc.) for coupling the frames 58 and/or the rolls 64 to the stringers 68. In the illustrated embodiment, the carry rolls 64a are supported between the stringers 68 while the return rolls 64b are supported between the stands 60. In the illustrated embodiment, the stringers 68 are supported from above the frames 58 (e.g., by a chain 70 (FIG. 8) suspended from a roof surface (not shown)), but are connected to the stands 60 by a pin connection.

Referring again to FIG. 6, the maingate conveyor 34 also includes a bridge 72 extending between the boot end 42 and the conveyor support structure 54 to support the conveyor belt 50 passing therebetween. The bridge 72 includes a first end 76 coupled to the boot end 42 and a second end 80. The bridge 72 defines a bridge axis 78 extending between the first end 76 and the second end 80. In the illustrated embodiment, the bridge axis 78 is substantially parallel to the conveyor axis 56.

Figure 9:
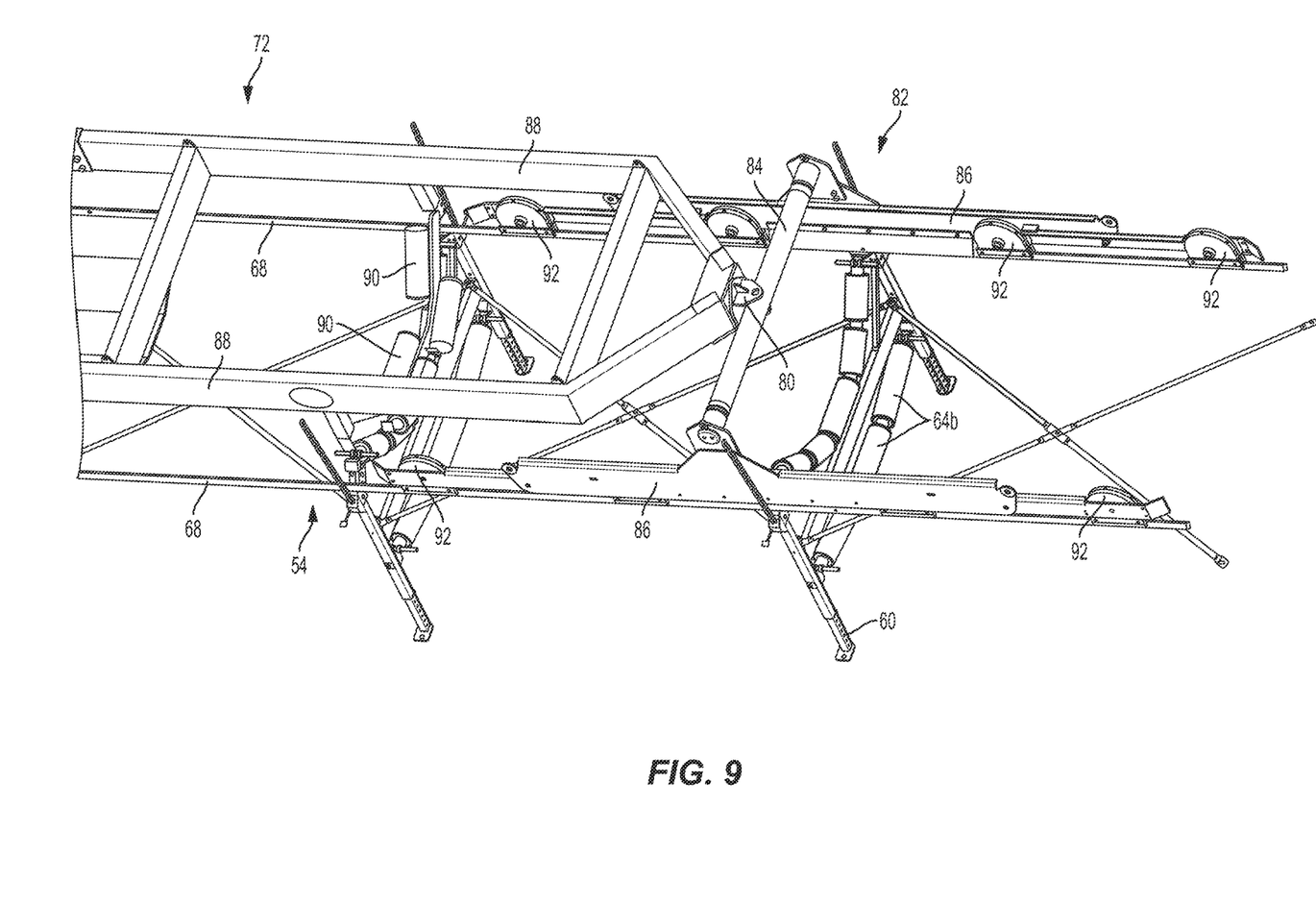
FIG. 9 is an enlarged perspective view of a carriage supporting a second end of the bridge of FIG. 6.

As shown in FIG. 9, the second end 80 is coupled to the support structure 54. Specifically, a carriage 82 supports the second end 80 of the bridge 72 for movement relative to the support structure 54. In the illustrated embodiment, the carriage 82 is supported by the stringers 68 such that the carriage 82 can move (e.g., roll or slide) along the stringers 68. Stated another way, the stringers 68 act as a pair of rails supporting the carriage 82 for movement relative to the support structure 54 in a direction parallel to the bridge axis 78 or parallel to the conveyor axis 56. The carriage 82 includes a bar 84 coupled to the second end 80 of the bridge 72, and a pair of blocks 86. In the illustrated embodiment, the second end 80 is coupled to the bar 84 by a pin connection. Also, in the illustrated embodiment, each of the blocks 86 includes rollers 92 that engage the stringers 68 and support the carriage 82 for movement relative to the support structure 54. In some embodiments, an outer surface of each roller 92 includes a peripheral groove for receiving the stringer 68.

Referring to FIGS. 6 and 8, the bridge 72 further includes a pair of beams 88 positioned parallel to one another and extending between the first end 76 and the second end 80. In the illustrated embodiment, multiple bridge idler rolls 90 are supported by cross-members extending laterally between the beams 88. The bridge idler rolls 90 are positioned between the beams 88 to support a portion of the conveyor belt 50 (e.g., a portion of the upper run). As shown in FIG. 8, in the illustrated embodiment the pair of beams 88 are parallel to one another and positioned in a common plane, and the cross-members extend below the common plane of the beams 88. The bridge rolls 90 therefore are offset from the common plane and form a trough for supporting the upper run of the belt 50.

Figure 10:
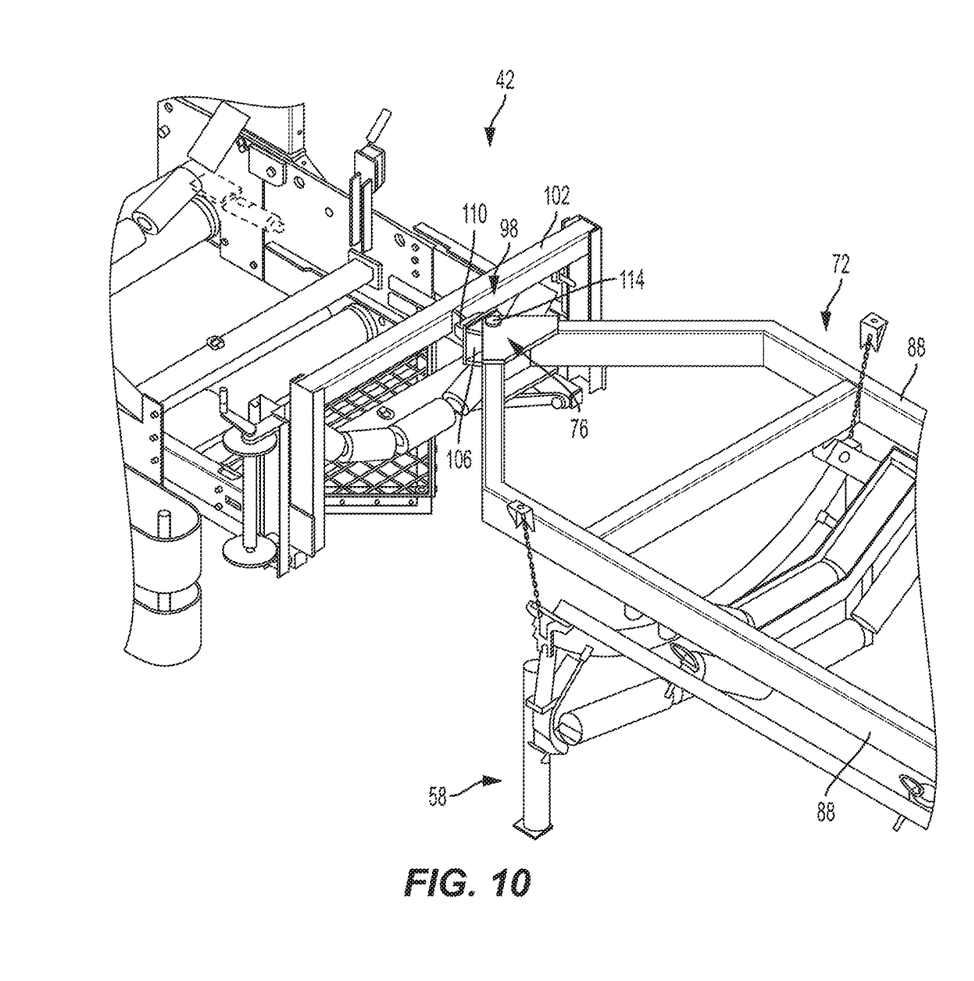
FIG. 10 is an enlarged perspective view of a connection between the boot end and the bridge of FIG. 6.
Figure 11:
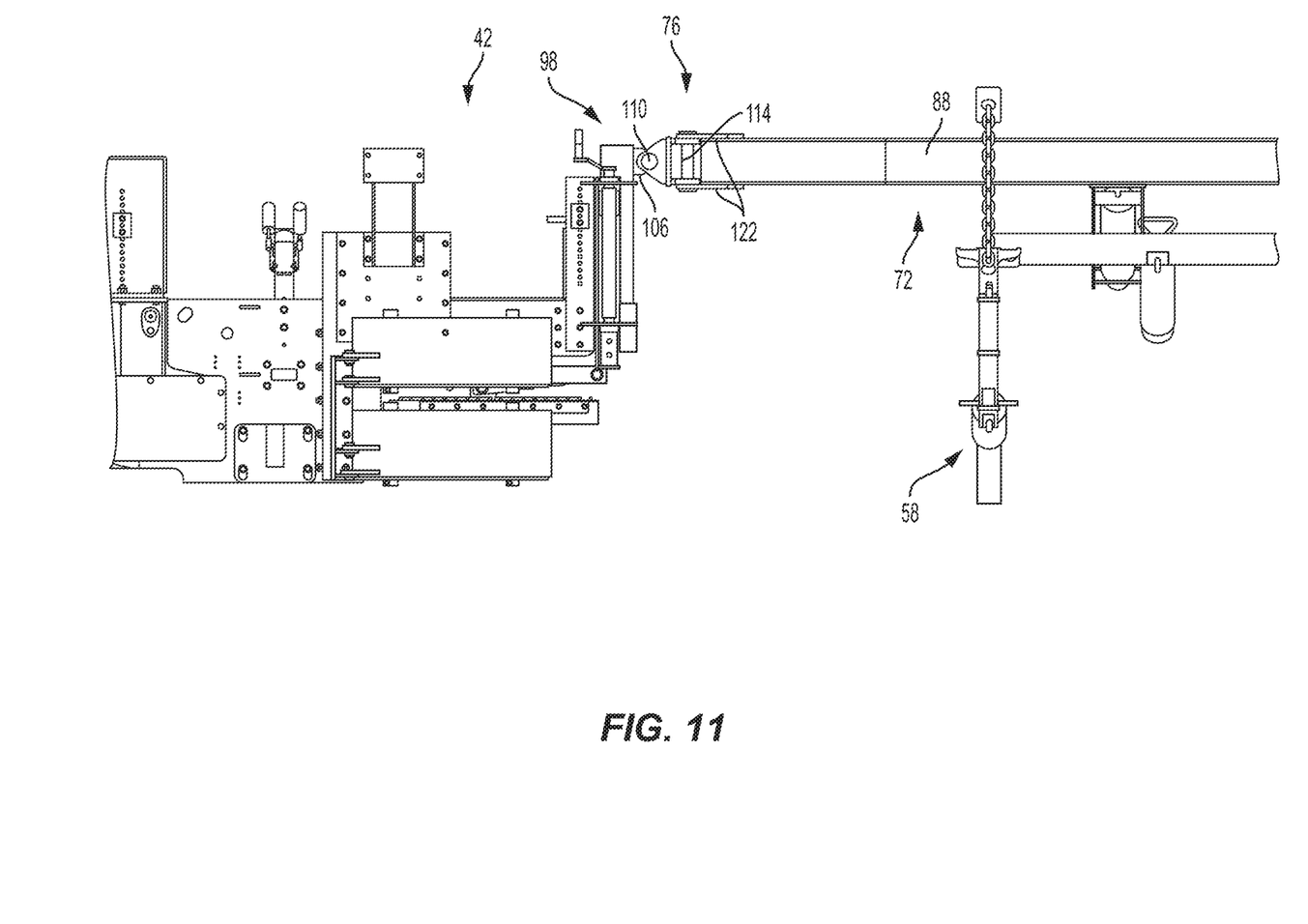
FIG. 11 is a side view of the connection between the boot end and the bridge of FIG. 10.

As shown in FIGS. 10 and 11, the first end 76 of the bridge 72 is pivotably coupled to the boot end 42 at a pivot joint 98. In the illustrated embodiment, the beams 88 of the bridge 72 converge with each other at the first end 76 and the second end 80. The boot end 42 includes a lateral bar 102 and a pivoting bracket 106 coupled to the first end 76. The bracket 106 is pivotably coupled to the bar 102 by a first pin 110 to permit the bracket 106 to pivot relative to the bar 102 about a first axis (e.g., pivoting in a vertical plane). In addition, the first end 76 of the bridge 72 is coupled to the bracket 106 by a second pin 114 that is perpendicular to the first pin 110 to permit the bridge 72 to pivot about a second axis (e.g., in a lateral plane). As best shown in FIG. 11, the second pin 114 extends through a pair of flanges 122 positioned on the upper and lower surfaces of the bridge's first end 76.

The pin connections permit the bridge 72 to move both laterally and vertically relative to the boot end 42. For example, in the illustrated embodiment the first pin 110 is oriented laterally to permit the bridge 72 to pivot in a vertical plane relative to the bar 102, and the second pin 114 is oriented vertically to permit the bridge 72 to pivot in a lateral plane relative to the bracket 106 and the bar 102. In other embodiments, the pivot joint 98 may be formed in another manner.

Figure 12:
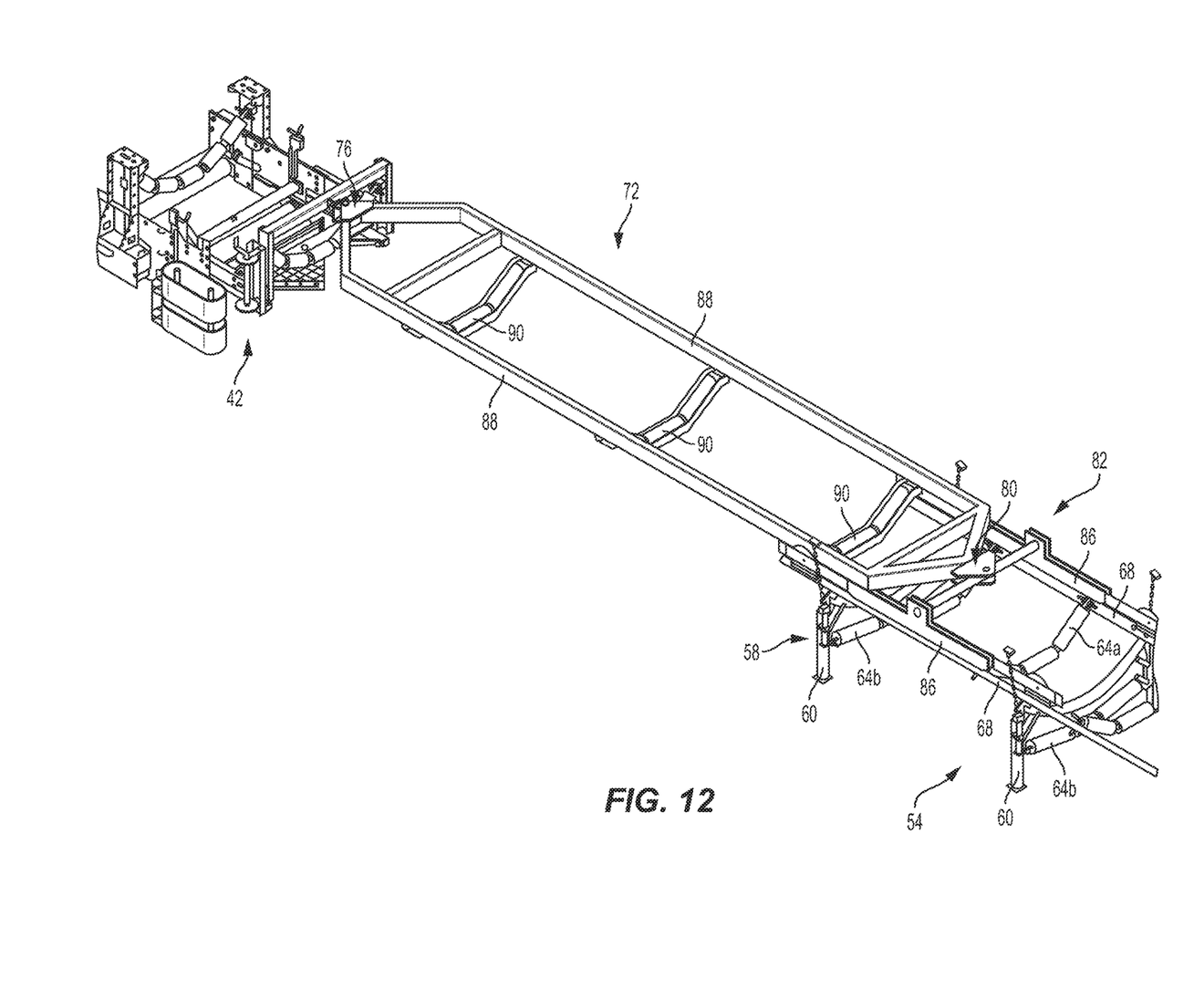
FIG. 12 is a perspective view of the boot end and the bridge of FIG. 6 with a portion of the support structure removed.

In the illustrated embodiment, the boot end 42 advances in the direction 24 as the mining machine 10 progresses through the mine seam 18. In preparation for this advancement, operators typically disassemble and remove multiple sections of the support structure 54 at the beginning of a cutting shift. FIG. 12 illustrates the conveyor with sections of the support structure 54 removed. In a conventional conveyor, the removal of the support structure 54 would leave a large portion of the conveyor belt 50 unsupported between the boot end 42 and the nearest end of the support structure 54, resulting in belt damage, spillage of the conveyed material due to the loss of trough angle, and other safety issues.

The bridge 72 is coupled to the movable boot end 42 and overlaps the end of the fixed support structure 54, providing continuous support for the belt 50 between these components. In the illustrated embodiment, the boot end 42 also includes boot end idler rolls 124 (FIG. 6) and a belt lifter 126 (FIG. 6) for raising the belt 50 and permitting an operator to access the structure beneath the bridge 72 while the bridge 72 remains supported by the carriage 82. In addition, the bridge idler rolls 90 support the intermediate portion of the upper run of the belt 50 between the boot end 42 and the conveyor support structure 54. As the mining operation advances, the carriage 82 moves along the stringers 68 and the boot end 42 advances until it is positioned a predetermined distance with respect to the nearest end of the conveyor support structure 54. The process of disassembling and removing a portion of the support structure 54 may be repeated again at the beginning of each cutting shift.

Similarly, the bridge 72 could also be used to support the conveyor belt 50 of an advancing mining operation. Instead of disassembling the support structure 54 to accommodate movement of the boot end 42, the boot end 42 is instead moved away from the existing support structure 54 to form a gap between the boot end 42 and the end of the support structure 54. The bridge 72 moves with the boot end 42 and the carriage 82 moves along the stringers 68 toward the end of the support structure 54. Operators may then assemble additional sections of the support structure 54 in the gap below the bridge 72, extending the support structure 54 toward the boot end 42.

In other embodiments, the first end 76 of the bridge 72 could be movably coupled to the boot end 42, either in addition to or instead of the second end 80 being movably coupled to the support structure 54.

The bridge 72 spans the gap between the boot end 42 and the nearest bay of the support structure 54. The bridge 72 is capable of advancing automatically in conjunction with the advance of the boot end 42 and/or other mining equipment. The bridge 72, and particularly the bridge idler rolls 90 positioned between the beams 88, provides continuous belt support even when multiple sections of the support structure 54 are removed to accommodate the advance of the mining operation. As a result, the bridge 72 reduces risk of belt damage and reduces the possibility that the carry run of the conveyor belt 50 will sag or dip and contact the return run of the conveyor belt 50, which can cause friction and generate heat in the belt 50.

In addition, the continuous support reduces the risk of operator harm (e.g., caused by spillage of the cut material), permitting operators to efficiently remove sections of the support structure 54 without requiring significant additional time or effort.

Although aspects have been described in detail with reference to certain preferred embodiments, variations and modifications exist within the scope and spirit of one or more independent aspects as described.

What is claimed is:

1. A conveyor comprising:
a belt for carrying material in a direction of travel;
a support system supporting at least a portion of the belt, the support system including a first end spaced apart from a second end by a gap extending along the direction of travel; and
a bridge for supporting a portion of the belt moving between the first end and the second end, the bridge extending across the gap between the first end and the second end, the bridge being movable relative to at least one of the first end and the second end in a direction parallel to the direction of travel.

2. The conveyor of claim 1, wherein the support system includes a support structure and a boot end, the support structure having a plurality of frames and rolls for engaging the belt, the support structure forming the first end, the boot end being movable relative to the support structure and forming the second end.

3. The conveyor of claim 2, wherein the support structure further includes a pair of rails extending between the frames, wherein the bridge is coupled to a carriage supported for rolling movement along at least one of the rails.

4. The conveyor of claim 3, wherein each frame includes a pair of legs, and the rolls include a first set of rolls and a second set of rolls, the first set of rolls extending between the pair of rails and supporting a first run of the belt, the second set of rolls extending between the pair of legs and supporting a second run of the belt.

5. The conveyor of claim 1, wherein the bridge includes one end pivotably coupled to the second end of the support system and secured against movement relative to the second end in a direction parallel to the direction of travel.

6. The conveyor of claim 5, wherein the second end includes a bar and a bracket, the bracket pivotably coupled to the bar by a first pin, wherein the one end of the bridge is pivotably coupled to the bracket by a second pin oriented perpendicular to the first pin.

7. The conveyor of claim 1, wherein the bridge includes one end coupled to the second end and another end coupled to the first end of the support system and supported for movement relative to the first end in a direction parallel to the direction of travel.

8. The conveyor of claim 1, wherein the bridge includes a pair of elongated members and a plurality of bridge rolls, the elongated members extending between the first end and the second end, the bridge rolls positioned laterally between the members and supporting at least one run of the belt.

9. The conveyor of claim 8, wherein the elongated members are oriented parallel to one another and positioned in a common plane, and the bridge rolls are positioned offset from the plane.

10. A bridge for a conveyor, the conveyor including a belt and a support system supporting the belt, the support system including a support structure and a movable boot end, the support structure including a support end spaced apart from the boot end by a gap, the belt extending across the gap in a direction of travel and including a first run and a second run, the bridge comprising:
a first end configured to be coupled to the boot end;
a second end opposite the first end, a bridge axis extending between the first end and the second end and oriented substantially parallel to the direction of travel, the second end configured to be supported for movement relative to the support structure in a direction parallel to the bridge axis;
a pair of elongated members extending between the first end and the second end; and
at least one roll positioned between the elongated members transverse to the bridge axis, the roll configured to support a portion of the belt.

11. The bridge of claim 10, wherein the first end is pivotably coupled to a bracket configured to be coupled to the boot end, the first end secured against movement relative to the boot end in a direction parallel to the bridge axis.

12. The bridge of claim 10, and further comprising a bracket, wherein the first end is pivotably coupled to the bracket by a pin, the bracket supported for pivotal movement independent of the bridge about an axis oriented perpendicular to the pin.

13. The bridge of claim 10, further comprising a carriage coupled to the second end and supported for rolling movement relative to the support structure.

14. The bridge of claim 13, wherein the carriage includes a support block including at least one roller for engaging a rail of the support structure.

15. The bridge of claim 10, wherein the elongated members are oriented parallel to one another and positioned in a common plane, wherein the at least one roll is offset from the plane.

16. A conveyor comprising:
a belt for carrying material in a direction of travel;
a support system supporting at least a portion of the belt, the support system including a first end spaced apart from a second end by a gap extending along the direction of travel; and
a bridge for supporting a portion of the belt moving between the first end and the second end, the bridge extending across the gap between the first end and the second end, the bridge including at least one elongated bridge member extending between a first end and a second end, the first end of the bridge member coupled to the first end of the support system, the second end of the bridge member coupled to the second end of the support system, and at least one roll configured to support a portion of the belt.

17. The conveyor of claim 16, wherein at least one of the first end and the second end of the bridge is supported for movement relative to the support system in a direction parallel to the direction of travel.

18. The conveyor of claim 17, wherein the support system includes a pair of rails, wherein the one of the first end and the second end of the bridge is coupled to a carriage supported for rolling movement along the rails.

19. The conveyor of claim 16, wherein the second end of the bridge is pivotably coupled to the second end of the support system and secured against movement relative to the second end in a direction parallel to the direction of travel.

20. The conveyor of claim 16, wherein the bridge member is positioned in a plane and the at least one roll is offset from the plane.

* * * * *